Patented Aug. 2, 1949

2,477,850

UNITED STATES PATENT OFFICE 2,477,850

ALKYLOXY BENZYL PYRIDINIUM COMPOUNDS

Gordon A. Alles, San Marino, and Burnett B. Wisegarver, South Pasadena, Calif.; said Wisegarver assignor to said Alles No Drawing. Application July 13, 1944, Serial No. 544,814

4 Claims. (Cl. 260—297)

This invention relates to new and useful high molecular alkyloxy substituted benzyl pyridinium compounds. The compounds of our present invention are benzyl pyridinium compounds substituted in the phenyl ring of the benzyl group by one high molecular alkyloxy radical that contains 12 to 18 carbon atoms.

The benzyl pyridinium compounds of our invention have been found to be distinguished by a remarkably high antibiotic acivity upon bacteria, fungi, and yeasts, and to be notably distinguished from most hitherto described quaternary ammonium compounds having antibiotic activity by their stability under strongly alkaline conditions. The antibiotic activities of these compounds find particular application for sterilizing skin surfaces and in local treatment of bacterial and fungal infections of animals and man. The compounds are also effective agents for preserving solutions and sterilizing surgical instruments. They are active cationic detergent agents and may be used as detergents for particular purposes.

The compounds may be more particularly described as pyridinium compounds in which one of the non-ionic valance linkages of the nitrogen atom is attached to a high molecular alkyloxy substituted benzyl radical and the remaining three non-ionic valance linkages are those bonding the nitrogen atom into a pyridine ring.

They have the general structural formula

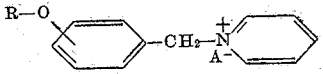

wherein R is a member of the group consisting of high molecular alkyloxy radicals having 12 to 18 carbon atoms, and A⁻ is an anionic radical such as hydroxyl, halide, sulfate, methosulfate, etc.

These pyridinium compounds have been found to be effectively produced in satisfactory yields by reaction of properly substituted benzyl chlorides with pyridine, dissolved in a suitable solvent. The most suitable solvent for such reaction has been found to be ethyl alcohol, with the reactants present in fairly high concentrations. For sufficiently rapid reaction, the temperature should be maintained above room temperature but should not, in general, exceed 100° C., and the reaction in some cases is best carried out at a temperature below 100° C. using longer periods of reaction.

The high molecular alkyloxy substituted benzyl chlorides useful as intermediates for the production of the compounds herein described have not been heretofore produced or described by others, and we have found a general type method of synthesis for producing these intermediate benzyl chlorides that is equally well applied to the preparation of the ortho, meta, and para derivatives. In the general formula given the variant possibilities of the positioning of the high molecular alkyloxy radical in relation to the pyridinium group is indicated by the joining of this alkyloxy group through the side of the benzene ring.

The following examples illustrate compounds in accordance with our invention and the type methods we have used for preparing such compounds.

Example 1

A solution of 100 grams (0.40 mole) dodecyl bromide in 200 milliliters ethanol is treated with 65 grams (0.40 mole) potassium salt of 2-hydroxybenzyl alcohol by refluxing for five hours. Formed potassium bromide is filtered off, the ethanol distilled off, and the residue extracted with 2 normal sodium hydroxide solution and water leaving an oily product that is dried with anhydrous calcium chloride and then distilled to yield 2-dodecyloxybenzyl alcohol boiling at 181–190° C. under 1 millimeter of mercury pressure. To 64 grams (0.20 mole) of this alcohol dissolved in 60 milliliters benzene and 5 milliliters pyridine is added 26 grams (0.22 mole) thionyl chloride and the mixture refluxed for twenty minutes to drive off the formed sulfur dioxide and hydrochloric acid. The benzene solution is then washed with ice water and dried over potassium carbonate and distilled to give 2-dodecyloxybenzyl chloride boiling at 173–185° C. under 1 millimeter of mercury pressure which solidifies to give a solid melting at 23° C.

The corresponding 3- and 4-dodecyloxybenzyl chlorides may be made by carrying through similar procedures and starting with the 3- and 4-hydroxybenzyl alcohols which are readily obtained from the available corresponding aldehydes.

The dodecyloxybenzyl chlorides so obtained are mixed with an equivalent of pyridine dissolved in three to four volumes of ethanol and heated in a sealed tube to 100 C. for twenty-four hours to prepare the corresponding dodecyloxybenzyl pyridinium chlorides. With the 2- derivative there is obtained the non-hygroscopic 2-dodecyloxybenzyl pyridinium chloride melting at 76–78° C. while with the 4-derivative the pyridinium chloride is a very hygroscopic solid.

Example 2

A solution of 111 grams (0.40 mole) tetradecyl bromide in 200 milliliters ethanol is treated with 65 grams (0.40 mole) potassium salt of 2-hydroxybenzyl alcohol by refluxing five hours then filtering off the potassium bromide formed. After distilling off the ethanol the residue is taken up with ether and the product well washed with normal sodium hydroxide solution and then with water. After drying the ether solution with anhydrous magnesium sulfate the ether is distilled off, then some unchanged tetradecyl bromide recovered by heating to about 175° C. under 4 millimeters mercury pressure. To this crude tetradecyloxybenzyl alcohol there is added 90 milliliters benzene and 5 milliliters pyridine to a homogeneous solution and then 35 grams (0.30 mole) thionyl chloride added. After refluxing the mixture for thirty minutes to drive off sulfur dioxide and hydrochloric acid the product is well washed with water, then dried over potassium carbonate and distilled to yield 2-tetradecyloxybenzyl chloride while boils at 213-222° C. under 4 millimeters of mercury pressure.

By heating the 2-tetradecyloxybenzyl chloride so obtained with an equivalent of pyridine in two volumes of ethanol at 70° C. for two days, then distilling off the ethanol and crystallizing the product from acetone with ether there is obtained a nicely crystalline 2-tetradecyloxybenzyl pyridinium chloride which melts between 45° and 51° C.

Example 3

Reaction of hexadecyl bromide with the potassium salts of hydroxybenzyl alcohols is carried through under the conditions described in Examples 1 and 2. Using the potassium salt of 2-hydroxybenzyl alcohol there is obtained 2-hexadecyloxybenzyl alcohol which decomposes on attempting distillation but is carried on through without distillation, as described in Example 2 above, to form the chloride which boils at 238-240° C. under 5 millimeters of mercury pressure.

Reaction of equal molal amounts of 2-hexadecyloxybenzyl chloride and pyridine in ethanol yields 2-hexadecyloxybenzyl pyridinium chloride which crystallizes from acetone with ether and melts at 69-73° C.

Example 4

Reaction of octadecyl bromide with the potassium salts of hydroxybenzyl alcohols is carried through under the conditions described in Examples 1 and 2. Using the potassium salt of 2-hydroxybenzyl alcohol there is obtained 2-octadecyloxybenzyl alcohol which is a solid at room temperatures and melts on heating at 52-54° C. This alcohol is converted into the corresponding chloride following the procedures given in Example 2 to yield 2-octadecyloxybenzyl chloride which has a melting point of 51-52° C.

Reaction of 2-octadecyloxybenzyl chloride with an equivalent of pyridine in three volumes of ethanol at 100° C. for fifteen hours yields 2-octadecyloxybenzyl pyridinium chloride which melts at 79-80° C.

While the salts described in the above examples are suitable for most purposes, the pyridinium compounds with other anionic radicals may also be prepared if desired. The pyridinium hydroxides are readily prepared in water solution by addition of an equivalent of an alkali hydroxide. These pyridinium hydroxides are strongly alkaline bases and are notable with regard to their stability, and their solutions are particularly useful as detergents and antibiotic preparations under any alkaline conditions that may be desired.

Salts with anionic radicals other than those described in the above examples may be prepared either by acid neutralization of the pyridinium hydroxides or by metathesis of the salts above described with suitable inorganic salts. Thus, for example, the pyridinium sulfates can be prepared by shaking solutions of the pyridinium chlorides with silver sulfate.

The alkyloxybenzyl pyridinium compounds described in the above examples are soluble in water to varying extent depending primarily upon the size of the alkyloxybenzyl group. An optimal relationship between good solubility in water and very high antibacterial activity for organisms such as the staphylococci and coli bacteria is found with the dodecyloxybenzyl and tetradecyloxybenzyl pyridinium salts. With certain organisms such as the trichophyton fungi the highest antibiotic activity may be found with the tetradecyloxybenzyl or higher alkyloxybenzyl pyridinium salts though the extent of their activity is limited by lower solubility in water of the hexadecyloxybenzyl and octadecyloxybenzyl compounds.

Because of their relatively high solubility the dodecyloxybenzyl quaternary ammonium compounds are most generally useful as antibiotic agents. Their activity is very high in comparison with any other known agent of the type of cationic soaps. Thus 2-dodecyloxybenzyl pyridinium chloride kills *staphylococcus aureus* inoculations within ten minutes at a concentration of 1:80,000, and the corresponding 4-dodecyloxybenzyl pyridinium compound is effective in the same concentration range on this organism. The activity of these compounds is not limited to the gram positive organisms as they are approximately equally active on the gram negative coli bacteria in the same concentration range. The gram negative *eberthella typhosa* is killed within ten minutes by 2-dodecyloxybenzyl pyridinium chloride in a concentration of 1:112,000 and 4-dodecyloxybenzyl pyridinium chloride is similarly effective at a concentration of 1:56,000. On fungi such as the *trichophyton interdigitale* 2-dodecyloxybenzyl pyridinium chloride kills in ten minutes at a concentration of 1:80,000, with the 4-dodecyloxybenzyl compound having comparable activity, while the 2-tetradecyloxybenzyl and 2-hexadecyloxybenzyl compounds are about twice as active on this organism.

In antibiotic preparations the nature and proportions of other ingredients that may be conjugated or compounded with the higher alkyloxybenzyl pyridinium compounds are subject to variation dependent upon the effect desired and the method of their use. For many purposes a simple solution in water, flavored or odored and tinted may be most desirable. Where coincident solution of fatty materials is desired alcohol or acetone in concentrations up to about 70 percent may be added and the addition of such relatively volatile non-aqueous solvents will increase the evaporation rate. For purposes of maintaining a non-evaporating antiseptic film there may be added small percentages of non-volatile glycols like glycerol, glycol ethers or cellulose ethers or water soluble gums.

We claim:
1. An alkyloxybenzyl pyridinium compound having the general structural formula

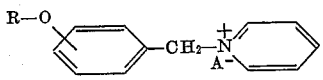

wherein R is an alkyl radical having 12 to 18 carbon atoms and $A^-$ is an anionic radical.

2. A 2-alkyloxybenzyl pyridinium compound having the structural formula

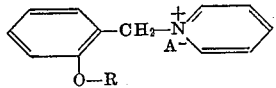

wherein R is an alkyl radical having from 12 to 18 carbon atoms and $A^-$ is an anionic radical.

3. 2-dodecyloxybenzyl pyridinium chloride.
4. A compound of dodecyloxybenzyl pyridinium with an anionic radical.

GORDON A. ALLES.
BURNETT B. WISEGARVER.

REFERENCES CITED

The following references are of record in the file of this patent:

UNITED STATES PATENTS

| Number | Name | Date |
|---|---|---|
| 2,054,257 | Heuter | Sept. 15, 1936 |
| 2,132,902 | Lehner | Oct. 11, 1938 |
| 2,200,603 | Heintrich | May 14, 1940 |

Certificate of Correction

Patent No. 2,477,850                                          August 2, 1949

GORDON A. ALLES ET AL.

It is hereby certified that errors appear in the printed specification of the above numbered patent requiring correction as follows:

Column 2, line 49, for "100 C." read *100° C.*; column 4, line 32, for the words "quaternary ammonium" read *pyridinium*;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*